(12) United States Patent
Link

(10) Patent No.: US 7,178,357 B2
(45) Date of Patent: Feb. 20, 2007

(54) PORTABLE AIR CONDITIONING APPARATUS

(76) Inventor: John Link, 25 Park Way, Upper Saddle River, NJ (US) 07458

( * ) Notice: Subject to any disclaimer, the term of this patent is extended or adjusted under 35 U.S.C. 154(b) by 0 days.

(21) Appl. No.: 10/392,023

(22) Filed: Mar. 19, 2003

(65) Prior Publication Data

US 2003/0230109 A1 Dec. 18, 2003

Related U.S. Application Data

(63) Continuation-in-part of application No. 10/267,395, filed on Oct. 9, 2002, now Pat. No. 6,571,568.

(51) Int. Cl.
*F25D 11/00* (2006.01)
(52) U.S. Cl. .................... 62/440; 62/457.7
(58) Field of Classification Search ............ 62/244, 62/420, 421, 425, 457.1, 457.2, 457.7, 457.9, 62/464, 440, 457, 457.4
See application file for complete search history.

(56) References Cited

U.S. PATENT DOCUMENTS

| | | | | |
|---|---|---|---|---|
| 2,453,294 A | * | 11/1948 | Battley et al. | 454/89 |
| 2,998,714 A | * | 9/1961 | Bonzer | 62/312 |
| 3,595,536 A | * | 7/1971 | Ripley | 261/28 |
| 3,913,345 A | * | 10/1975 | Goettl | 62/183 |
| 4,311,017 A | * | 1/1982 | Reed et al. | 62/3.64 |
| 4,463,569 A | * | 8/1984 | McLarty | 62/3.2 |
| 4,798,060 A | * | 1/1989 | Long et al. | 62/310 |
| 4,841,742 A | * | 6/1989 | Biby | 62/420 |
| 4,953,831 A | * | 9/1990 | Albrecht | 261/102 |
| 5,030,389 A | * | 7/1991 | Cecil | 261/29 |
| 5,062,281 A | | 11/1991 | Oliphant et al. | 62/457 |
| 5,168,722 A | * | 12/1992 | Brock | 62/304 |
| 5,685,165 A | | 11/1997 | Bigelow, Jr. | 62/420 |
| 5,709,104 A | * | 1/1998 | Howcroft | 62/457.1 |
| 5,715,698 A | * | 2/1998 | Calton | 62/309 |
| 5,953,933 A | * | 9/1999 | Cheng | 62/425 |
| 6,192,702 B1 | * | 2/2001 | Shimogori | 62/259.3 |
| 6,227,004 B1 | * | 5/2001 | Gerstein | 62/421 |
| 6,325,137 B1 | * | 12/2001 | Elliott | 165/122 |
| 6,336,341 B1 | * | 1/2002 | McGraw et al. | 62/420 |
| 6,401,483 B1 | | 6/2002 | Kopp | |
| 6,669,556 B2 | * | 12/2003 | Gautney | 454/338 |

FOREIGN PATENT DOCUMENTS

JP 09196534 A * 7/1997

* cited by examiner

*Primary Examiner*—Mohammad M. Ali
(74) *Attorney, Agent, or Firm*—Barry G. Magidoff; Paul J. Sutton

(57) ABSTRACT

A portable cooling or heating system suitable for use on a vehicle such as a car, plane or boat, that does not have its own air conditioning system. The system is intended to be combined with a portable cooler chest and includes an electric fan unit that can be powered from the power supply on a vehicle. The cooling is provided by ice and the like. The system can also be used to heat a confined space by placing a hot material in the chest.

19 Claims, 5 Drawing Sheets

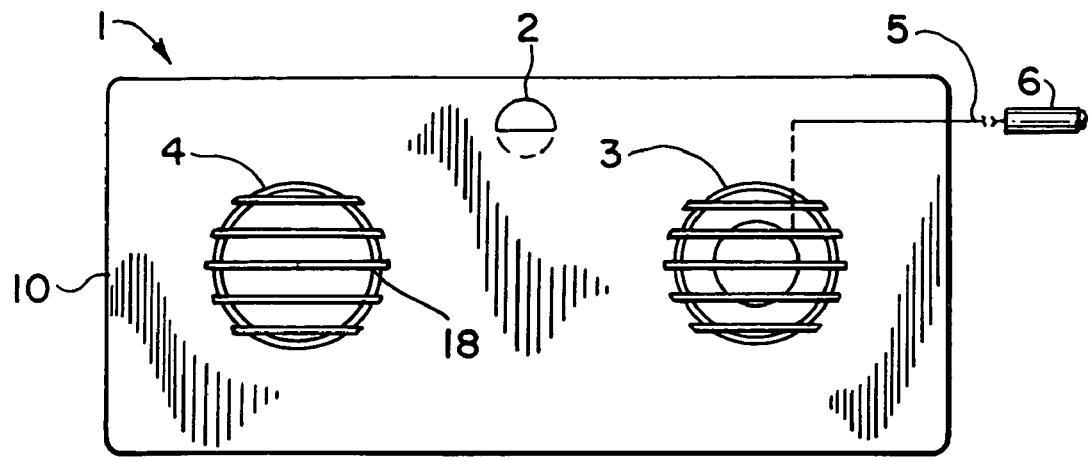
FIG. IA
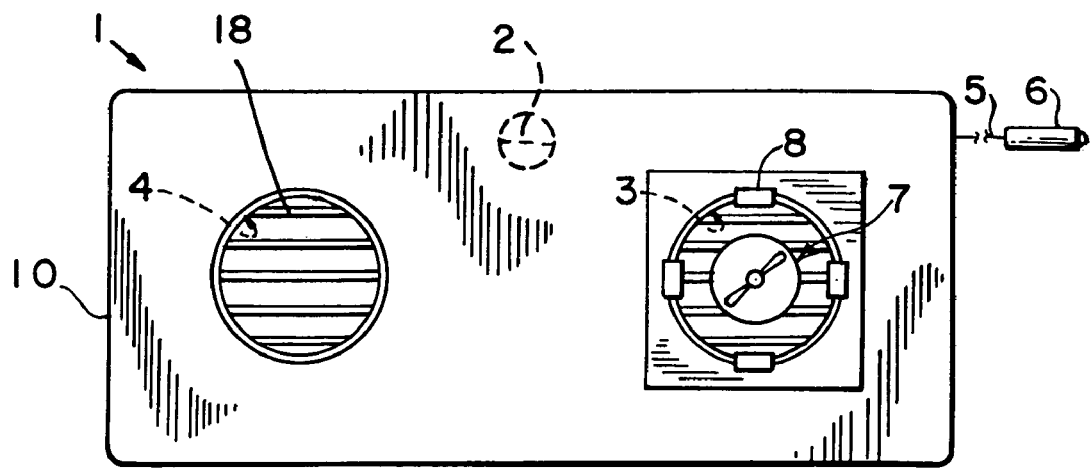
FIG. IB

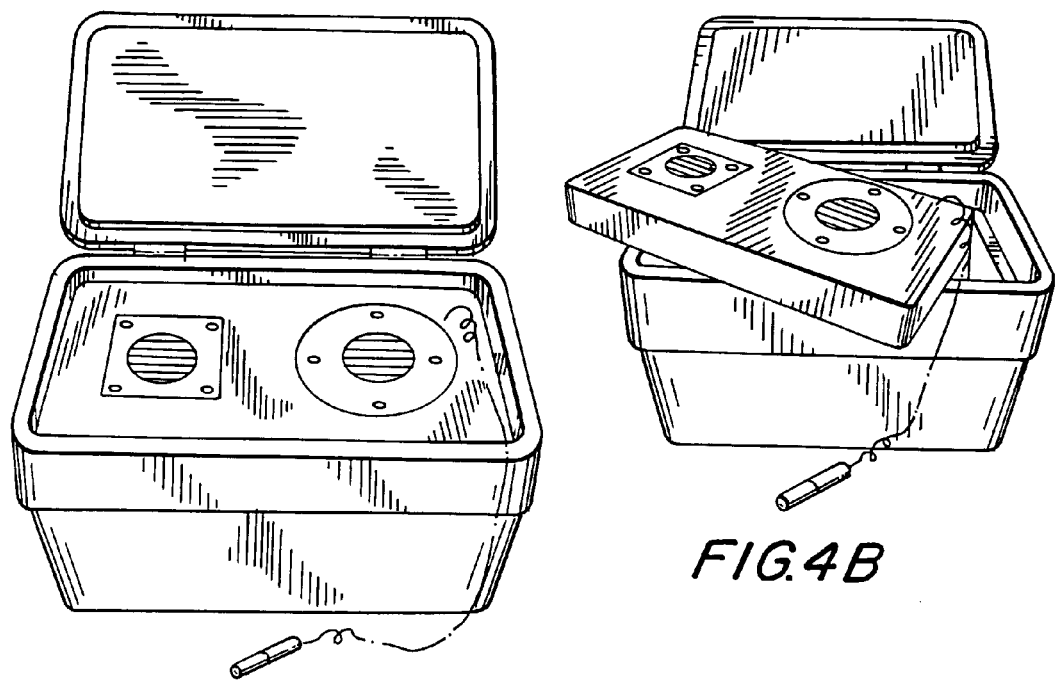
FIG.4A
FIG.4B
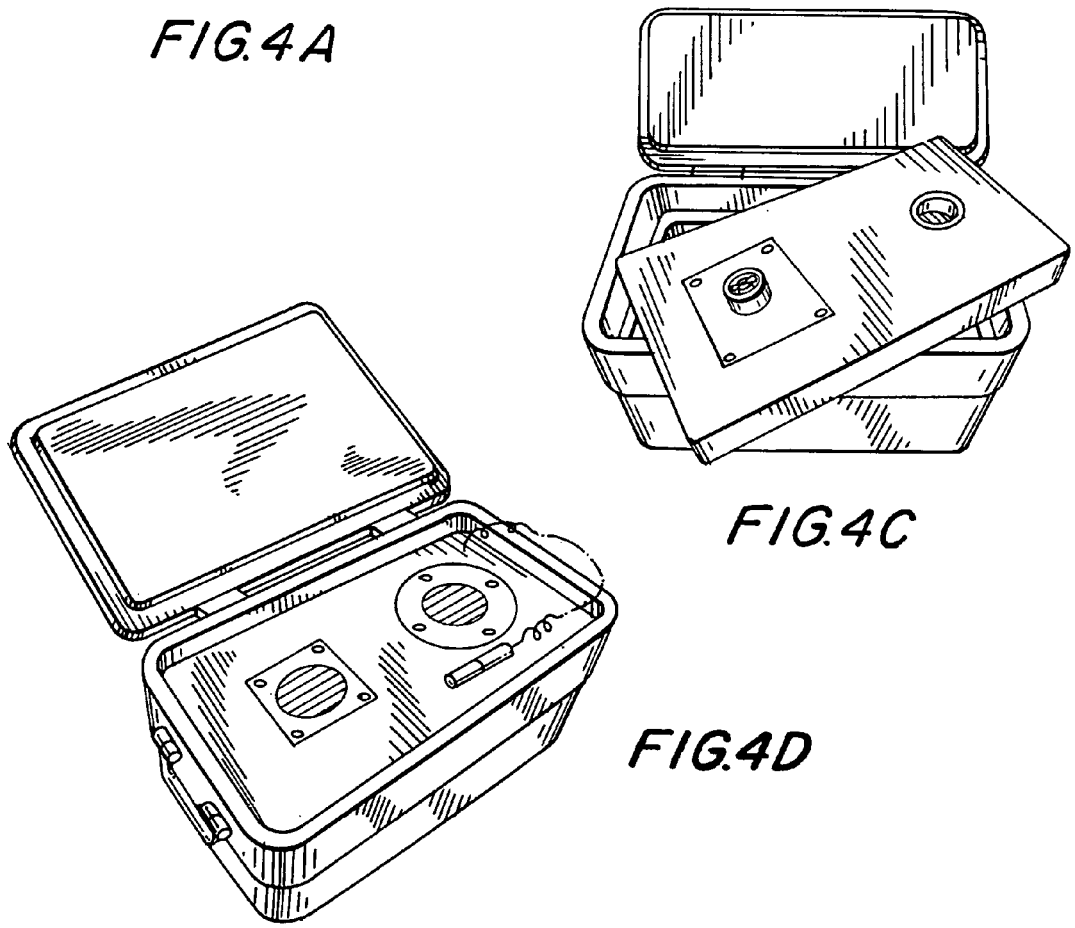
FIG.4C
FIG.4D

PORTABLE AIR CONDITIONING APPARATUS

This application is a continuation in part of U.S. application Ser. No. 10/267,395, filed on Oct. 9, 2002 now U.S. Pat No. 6,571,568.

BACKGROUND OF THE INVENTION

1. Field of the Invention

This invention relates to new systems and methods for providing portable air conditioning. More particularly, the invention relates to systems and methods for delivering portable cooling or heating suitable for use in a vehicle such as a car, boat, plane, that does not already have its own air conditioning system or a substantial power supply.

2. General Background and State of the Art

A variety of vehicles, typically smaller cars, airplanes, and boats, do not have their own cooling/heating system. In hot or cold weather these vehicles can be very uncomfortable. The addition of an add-on air conditioning system to a vehicle is a complex and expensive undertaking. With respect to certain airplanes, it is very difficult to install an add-on system because of available engine power, and certain FAA regulations severely restrict such add-ons. Adding a typical commercially available air conditioning system with either an electrical compressor or a belt driven compressor is not feasible for many such vehicles. Electrical compressors typically require 50 to 100 amps of power or more—which exceed the available power in many vehicles. A belt driven unit requires a significant amount of horse power which is not available in many vehicles. Thus, there has long been a need for a portable cooling/heating system for vehicles without such a system.

One such cooling system is disclosed in U.S. Pat. No. 5,685,165 to Bigelow. This air-conditioning system included a fan with a radiator that sits on top of a height adjustable support frame within an open ice chest. A pump pumps a heat exchange fluid, typically water taken from an ice-water mixture contained in the ice-chest, through a hose into the radiator, from which the fluid flows back into the ice chest. A single housing encloses the radiator and fan, and is attached to a collapsible frame which enables a user to position and angle the fan so that it points out of the open ice chest. The fan pulls air through a back end of the radiator, cooling the air, and then blows the cooled air out through a front end of the radiator. In an alternative embodiment, the fan's housing and frame rest on top of a closed ice chest, and the hose through which the heat exchange fluid flows enters the ice chest through openings drilled in the lid of the ice chest.

Another cooling system is disclosed in U.S. Pat. No. 5,062,281 (Oliphant, et al.). The cooling system of this device is intended to be used with an 8 to 32 ounce cup of ice water or some other appropriate fluid. The cooling unit is dimensioned to fit into the top of a cup, and contains two small batteries, typically C-size batteries, an intake fan with an on/off switch, and an air exit opening. When on, the fan pulls air in through an intake opening into contact with the fluid mixture in the cup. The fluid mixture can be either hot or cold, depending upon whether the device is to be used for cooling or heating. The air, either cooled or heated, then exits through a spout shaped air exit opening. This device is useful for an individual to cool or warm oneself, but is insufficient for cooling or heating a cabin of a vehicle, such as a boat or airplane.

Each of the prior art systems has certain drawbacks associated with them. For example, the power requirements of the Bigelow air-conditioning unit are rather substantial for a vehicle battery, since power is needed for both the fan and the pump. Additionally, the fan/radiator unit takes up substantially the entire space of the cooler or ice chest and thereby prevents the cooler from being used for its intended purpose of cooling food or beverages.

SUMMARY OF THE INVENTION

Therefore, it is an object of the present invention to provide a portable cooling system which is small enough so that it does not occupy an inordinate amount of space, yet is efficient enough to heat or cool a vehicle so its passengers are comfortable, and not place undue demands on the vehicles' electrical power supply system. It is further an object of the present invention to provide a portable air-conditioning system that utilizes a conventional portable ice chest without compromising its primary function of cooling food and beverages.

One exemplary embodiment of the present invention includes a cooling unit sized to fit inside a commercially available, insulated ice chest. Many such ice chests have a ridge on the inside of the chest upon which the cooling unit of the invention can rest. The cooling unit itself includes a fan to draw air from outside into the ice chest, and an exhaust vent by which air can exit the ice chest. The fan on the cooling unit can have an electrical connection for connection to an electrical power supply. When the ice chest is filled with ice, the air drawn into the chest by the fan and vented through the exhaust vent is cooled by movement through ice located in the chest. The cooling unit can optionally include an air directional wall that extends vertically downward from the cooling unit into the chest to force air into contact with the ice and facilitate the cooling process.

In another exemplary embodiment of the invention, the ice chest itself is modified, so that the air intake motor assembly is mounted in one side wall of the ice chest, and the air exhaust vent is mounted in a wall opposite of the wall with the motor assembly.

In yet another exemplary embodiment of the present invention, the cooling unit is designed to function as a lid for closing or covering the cooler. The lid includes two openings. A first opening contains a fan to draw air inside the cooler. A second opening is an exhaust vent for allowing air from inside the cooler to exit to the surrounding environment. Air is thereby circulated from the surrounding environment outside of the cooler through the fan into the cooler, and is pushed back out through the second opening. When the ice chest is filled with ice, the air drawn into the chest by the fan and vented through the exhaust vent is cooled by movement through ice located in the chest. The fan on the cooling unit has an electrical connection for connection to an electrical power supply.

The lid in accordance with the present invention could be sold separately from the cooler, to fit a variety of different cooler models and sizes, and enable a person already owning a cooler to replace its lid with the lid of the present invention, to utilize their cooler as a personal cooling apparatus. Similarly, a cooler could be sold already fitted with a lid comprising the cooling unit in accordance with the present invention.

The ice chest can also be filled with hot water or other hot liquid to heat the air being drawn into the chest, so that the device of the present invention can serve as a heating unit.

In all embodiments of the present invention, the ice chest be used to store food and beverages while simultaneously providing heating or cooling functionality to the surroundings. This was a disadvantage of the prior art, in that the heating/cooling apparatus took up much of the inner space of the cooler so as to prevent use of the cooler in maintaining the temperature of foods or beverages.

Brief Description of the Drawings

FIG. 1a illustrates a top view of an exemplary embodiment of the portable cooling apparatus of the present invention.

FIG. 1b illustrates a bottom view of an exemplary embodiment of the portable cooling apparatus of the present invention.

FIGS. 4a to 4d are photographs illustrating an exemplary embodiment of the portable cooling system of the present invention.

Detailed Description of the Invention

Figure 2:
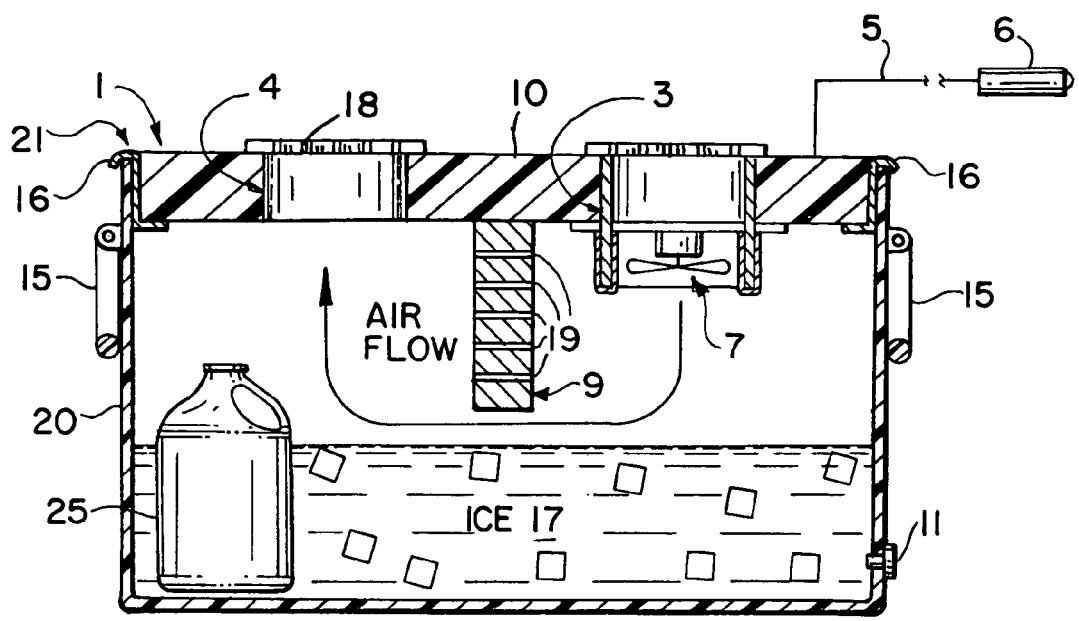
FIG. 2 illustrates a cutaway side view of an exemplary embodiment of the portable cooling apparatus of the present invention.

In the following description of the preferred embodiments reference is made to the accompanying drawings which form a part thereof, and in which are shown by way of illustration specific embodiments in which the invention may be practiced. It is to be understood that other embodiments may be utilized and structural and functional changes may be made without departing from the scope of the present invention.

A top view of the cooling unit of the present invention is depicted in FIG. 1a, and. a bottom view of the cooling housing 10 is shown in FIG. 1b. The cooling unit 1 includes a housing 10 sized generally to fit in the top of a commercially available ice chest. One such ice chest model is available from Igloo Products of Houston, Tex. The housing includes a molded, recessed pull handle 2, an opening 3 for the placement of an electric motor and fan unit 7, and an opening 4 for an air exhaust vent. In one embodiment, the motor and fan unit 7 is attached to housing 10 by a plurality of spring clips 8. Alternatively, the motor and fan unit 7 can be screw mounted to the housing 10, as shown in FIG. 4. Attached to the housing is a power cord 5 that connects to the motor unit. In one preferred embodiment, the unattached end of power cord 5 includes a cigarette plug 6 for connecting to a vehicle's cigarette lighter to form a 12 VDC connection for providing power to the motor unit. This enables the motor and fan unit 7 to be powered by a vehicle's battery.

A cutaway side view of the cooling unit of the invention is depicted in FIG. 2. An ice chest 20 is shown with an opening 21 at a top end of the chest 20. Ice chest 20 includes handles 15, a drain plug 11, and is at least partially filled with ice 17. The ice 17 can be partially melted or otherwise mixed with water. Cooling unit 1 is shown placed in the opening 21 of ice chest 20. If the inside of the ice chest 20 is lacking a ridge on the inside near the opening 21, a set of hooks 16 can be provided that hook onto the top end of ice chest 20 and which provide a resting place onto which the housing 10 of cooling unit 1 can be rested. A beverage container 25 is shown to illustrate that the ice chest's primary function of cooling food and beverages is compatible with the addition of the cooling unit 10.

In operation, the motor and fan unit 7 pulls air from the outside through opening 3, and blows the air into and through the ice 17 contained inside the ice chest 20. Coming into contact with the ice 17 cools the air. The cooled air then exits the ice chest 20 through the exhaust vent 4. Placed inside exhaust vent 4 can be a set of louvers 18 that are rotatable about an axis of the opening 4, and are also tiltable, so as to control the direction of the air being exhausted from the ice chest 20. The flow of the air through the ice chest is indicated by the arrow in the figure. The cooling unit 1 can also optionally include an air directional wall 9 to force air into contact with the ice 17. The air directional wall 9 can include a plurality of holes in the event the ice chest 20 is overfilled with ice, thus otherwise blocking the air flow.

Figure 3:
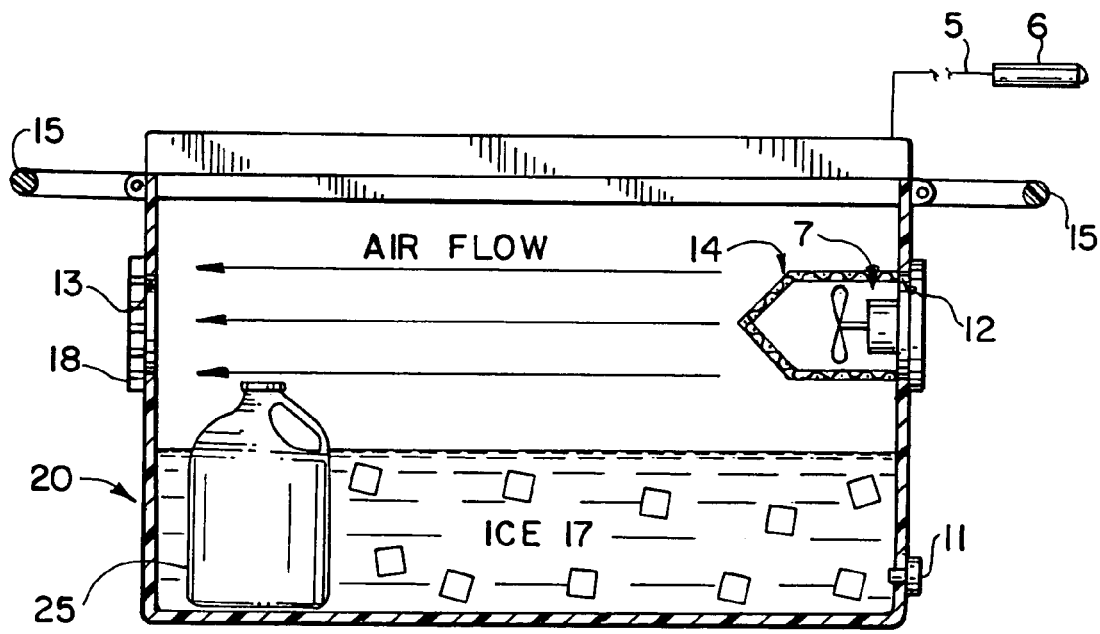
FIG. 3 illustrates a cutaway side view of an alternative embodiment of the cooling apparatus of the present invention.

An alternative embodiment of the cooling system of the invention is depicted in FIG. 3. In this embodiment, the ice chest 20 is itself modified with the addition of a first side opening 12 for the placement of the motor and fan unit 7, and a second side opening 13 for the exhaust vent 18. The motor and fan unit 7 is in this embodiment protected by a mesh screen 14. In operation, the motor and fan unit pulls air in from the outside through the first opening 12, blows the air across and through the ice as indicated by the arrows, so the cooled air exits through the exhaust vent 18. As with the first embodiment, the exhaust vent can include a set of louvers that are rotatable about an axis of the second opening 13, and are also tiltable, so as to control the direction of the air being exhausted from the ice chest 20. A beverage container 25 is shown to illustrate that the ice chest's primary function of cooling food and beverages is compatible with the addition of the cooling unit 10.

FIGS. 4a to 4d depict four photographic images of the cooling unit 1 of the invention inside and on top of an ice chest 20. FIG. 4a depicts a front view of an open ice chest with the cooling unit of the invention pleaded in the top opening of the ice chest. Note that in this embodiment, the motor and fan unit and the air exhaust vent are attached to the housing by means of screws. FIG. 4b depicts a side view of the cooling unit of the present invention, here shown removed from the inside of the ice chest resting on top of same. The ridge on the inside of the ice chest upon which the cooling unit rests is visible in the right hand side of the image. The thickness of the housing is dimensioned so that the unit does not protrude above the top of the ice chest while resting upon the ridge. FIG. 4c depicts the underside of the housing of a cooling unit resting on top of the ice chest. The fan blades of the motor and fan unit are visible in the left side of the image. Finally, FIG. 4d depicts a top view of the housing of the cooling unit, here placed inside the ice chest and resting on the inside ridge.

FIGS. 5a through 5d illustrate yet other exemplary embodiments of the present invention. In these embodiments, the air conditioning unit is created by using a housing which also functions as a lid to a cooler.

Figure 5A:
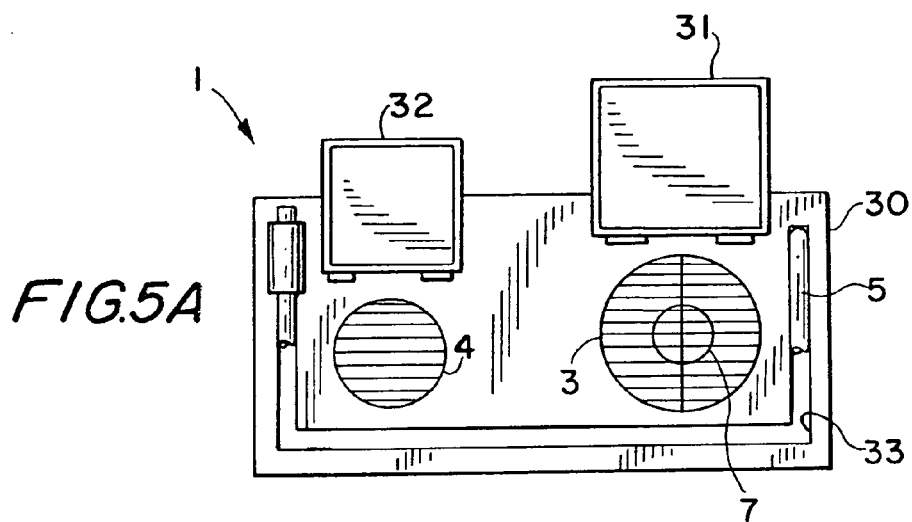
FIGS. 5a to 5d illustrate another exemplary embodiment of cooling system of the present invention.
Figure 5B:
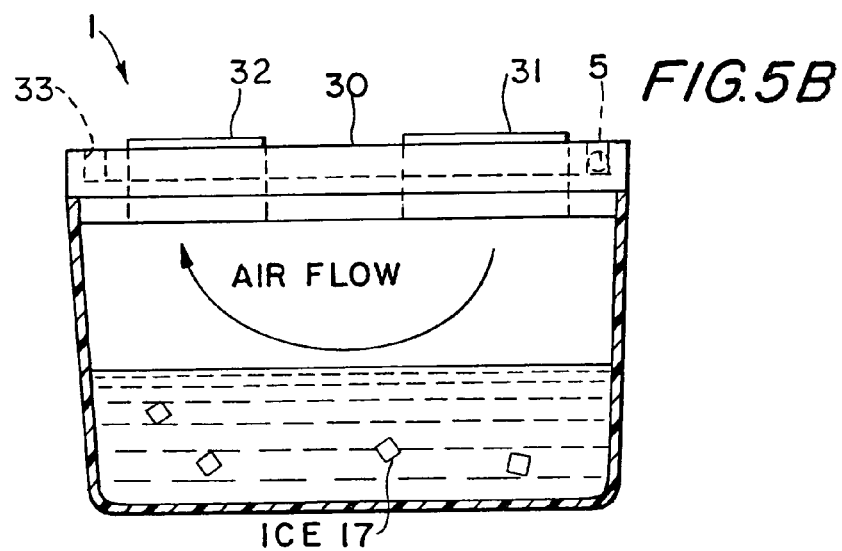
Figure 5C:
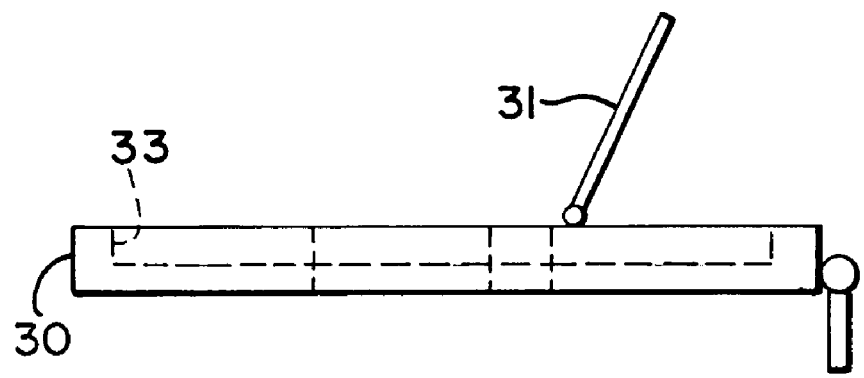

A top view of the cooling unit of the present invention is depicted in FIG. 5a, and side views of the cooling unit and lid housing are shown in FIGS. 5b and 5c. The cooling unit 1 includes a lid housing 30 sized generally to fit on the top of a commercially available ice chest. The lid housing 30 may be fixed with hinges, so as to be opened from one side, or from the rear, or may be completely removable from the cooler. The housing includes an opening 3 for the placement of a motor and fan unit 7, and an opening 4 for an air exhaust vent. The fan unit, for example, may be a conventional 12-volt brushless fan. As with other above mentioned embodiments, the exhaust vent can include a set of louvers that are rotatable and tiltable, so as to control the direction of the air being exhausted from the cooler. In an exemplary embodiment, the lid housing 30 may also comprise caps 31 and 32 for covering each of the openings 3 and 4 when they are not in use. The caps 31 and 32 may be hinged to the lid housing 30, or may be removably attached to the lid housing by snap closure or other convenient methods. When closed, the caps provide a fully sealed environment so that the lid housing 30 can be used for enclosing the cooler and utilizing the cooler for conventional purposes. Connecting to the motor unit is a power cord 5 to provide power to the fan. In one exemplary embodiment, the lid housing 30 is further molded to comprise a storage channel 33 for holding the power cord 5 when it is not in use. The storage channel 33 may, for example, be located around the perimeter of the lid housing.

Figure 5D:
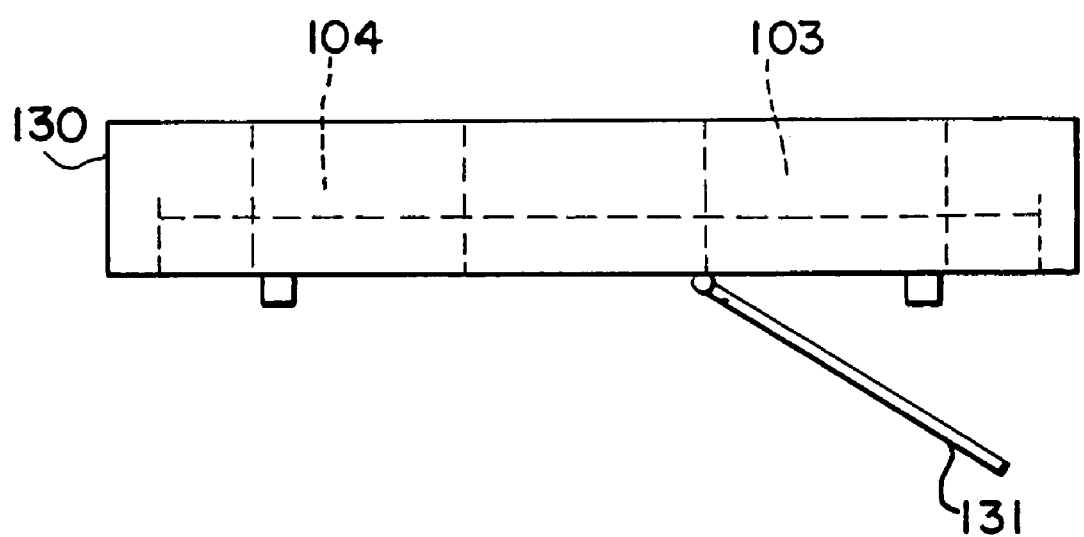

In the embodiment shown in the front view of FIG. 5*d*, at least one of the caps 131 opens downwardly from the cover. This embodiment is otherwise closely similar to that shown in FIGS. 5*a–c*, in that it includes a lid housing 130 sized generally to fit on the top of a commercially available ice chest. The lid housing 130 may be fixed with hinges, so as to be opened from one side, or may be completely removable from the cooler. The housing includes an intake opening 103 for the placement of the motor and fan unit, and an opening 104 for an air exhaust vent. As with other above mentioned embodiments, the a set of louvers can be provided, so as to control the direction of the air being exhausted from the cooler. In this exemplary embodiment, the lid housing 30 includes at least one hinged cap 131 for covering each of the openings 3 and 4 when they are not in use. The hinged caps is hinged to the lid housing 130 so as to swing downwardly so as to form a baffle, or directional wall, between the intake and outlet openings, as shown in FIG. 5*d*. The lid can otherwise be substantially the same as is shown in FIGS. 5*a–c*.

As described above, the lid housing in accordance with the present invention could be sold separately from the cooler, to fit a variety of different cooler models and sizes. Similarly, a specialized cooler in accordance with the present invention could be sold already fitted with a lid comprising the cooling unit in accordance with the present invention.

It should be noted that the air conditioning apparatus of the invention can also function as a heating unit if the ice chest is filled with a hot liquid, instead of a cool liquid such as an ice-water mixture.

The foregoing description of the preferred embodiments of the invention has been presented for the purposes of illustration and description. It is not intended to be exhaustive or to limit the invention to the precise form disclosed. Many modifications and variations are possible in light of the above teaching. The portable cooling device of the present invention may also be supplemented by features and other than those described herein. It is intended that the scope of the invention be limited not by this detailed description, but rather by the claims appended hereto.

What is claimed is:

1. A portable cooling system comprising:

a commercially available, portable ice chest having walls partially enclosing a cooler space, leaving an opening into the cooler space facing upwardly, and a ledge surrounding the opening into the cooler space; and a replacement lid dimensioned to fit on the ledge of the portable ice chest, the lid having first and second openings therethrough, each of the openings providing for the passage of air; the first opening being an intake for the passage of air only from the immediately surrounding space, into the ice chest, and the second opening being a vent for the passage of air out of the ice chest, the lid having a flat upper surface facing outwardly from the ice chest and through which the openings are formed;

a motor and fan unit connected into and suspended from the replacement lid and extending from the upper surface of the lid inwardly towards the cooler space; and through the first opening for facilitating the passage of air into the cooler chest; the motor and fan unit not substantially interfering with the placement of beverages to be cooled within the chest, and means for providing electrical power to the motor; wherein the ice chest is otherwise unchanged except for the replacement lid, and whereby when ice is placed in the chest, and electrical power supplied to the motor, air forced into the chest by the fan unit is cooled when contacting the cold material, and is capable of cooling an enclosed vehicle cabin upon exiting from the cooler space through the second opening.

2. The portable system of claim 1 further comprising a vent grill, covering the first opening, for the passage of air without permitting large particles to pass through the opening.

3. The portable system of claim 2, wherein the grill comprises a set of louvers that are rotatable about an axis of the opening.

4. The portable system of claim 3, wherein the set of louvers are also tiltable.

5. The portable system of claim 1, further comprising first and second caps for covering each of the first and second openings.

6. The portable system of claim 5 wherein the first and second caps are attached to the lid with hinges.

7. The portable system of claim 6 wherein the lid has an inner and an outer surface, and one of the first and second caps is hingedly connected to the inner surface of the lid at a location intermediate the two openings, thereby permitting the cap to swing inwardly, into the cooler chest from the lid, so as to extend downwardly into the chest, whereby when opened the cap can act as a baffle to direct air between the openings.

8. The portable system of claim 5 wherein the first and second caps are removably attached to the lid.

9. The portable system of claim 1, wherein the conductor for providing electrical power to the motor comprises a power cord having a plug suitable to electrically connect to the power supply of a vehicle.

10. The portable system of claim 9 further comprising a channel molded into the lid extending around its perimeter for storing the power cord when it is not in use.

11. The portable cooling system of claim 1, wherein the ledge defines the upper rim of the cooler chest.

12. A lid for covering the top opening to a conventional, commercially available beverage cooler chest, as a replacement for a conventional lid, and for providing air conditioning to a surrounding enclosed environment, the cooler chest also intended to hold frozen material to maintain perishable products within the chest in a chilled condition, the lid comprising:

a housing molded to fit on the upper rim surrounding and defining the opening of the cooler chest, the housing having an upper surface, the entire area of the upper surface being flat;

an air intake opening extending from the upper surface and into and through the housing designed to intake air only from the immediately surrounding space;

an air exhaust opening extending through the housing, and through the upper surface;

the intake and exhaust openings being formed through the flat upper surface;

a motor and fan positioned within and supported from the internal transverse surface defining the air intake opening, the motor and fan extending from the upper surface of the lid, for pulling air from the surrounding environment into the cooler, the motor and fan unit designed so as to not substantially interfere with the placement of beverages to be cooled within the chest; and an electrical connector for providing electrical power to the motor for the fan;

whereby when the housing is placed on the upper rim of the cooler to enclose the cooler, and frozen material is placed within the cooler, air can be circulated from the surrounding environment by the fan, through the air intake opening and into the cooler chest, cooling the air by contacting the frozen material inside the cooler, as the frozen material within the cooler chest melts, the cooled air being passed out through the air exhaust opening into the surrounding enclosed environment.

13. The lid of claim 12 further comprising a grill covering the air exhaust opening, for the passage of air without permitting large particles to pass through the opening.

14. The lid of claim 12, further comprising first and second caps for covering each of the air intake and air exhaust openings, respectively.

15. The lid of claim 14 wherein the first and second caps are attached to the housing with hinges.

16. The lid of claim 15 wherein the lid also has an inner, or lower, one of the first and second caps is attached to the inner surface of the lid by a hinge located between the two openings, thereby permitting the cap to swing inwardly, into the cooler chest from the lid, so as to extend downwardly into the chest intermediate the two openings, whereby the cap can act as a baffle when opened to direct air between the openings.

17. The lid of claim 14 wherein the first and second caps are removably attached to the lid.

18. The lid of claim 12, wherein the electrical connector for providing electrical power to the motor comprises a power cord having a plug suitable to electrically connect to the power supply of a vehicle.

19. The lid of claim 18 further comprising a channel molded into the lid extending around its perimeter for storing the power cord when it is not in use.

* * * * *